United States Patent
Dunham et al.

(10) Patent No.: US 10,434,838 B2
(45) Date of Patent: Oct. 8, 2019

(54) SUN VISOR WITH POSITIONAL COOLING/EXHAUSTING FAN

(71) Applicant: FORD GLOBAL TECHNOLOGIES, LLC, Dearborn, MI (US)

(72) Inventors: Scott Holmes Dunham, Redford, MI (US); Joseph John Bouwhuis, Brighton, MI (US); Bhavani Thota, Novi, MI (US)

(73) Assignee: Ford Global Technologies, Dearborn, MI (US)

( * ) Notice: Subject to any disclaimer, the term of this patent is extended or adjusted under 35 U.S.C. 154(b) by 27 days.

(21) Appl. No.: 15/696,870

(22) Filed: Sep. 6, 2017

(65) Prior Publication Data
US 2019/0070928 A1    Mar. 7, 2019

(51) Int. Cl.
*B60H 1/00* (2006.01)
*B60H 1/24* (2006.01)
*B60J 3/02* (2006.01)

(52) U.S. Cl.
CPC ......... *B60H 1/00871* (2013.01); *B60H 1/242* (2013.01); *B60J 3/0204* (2013.01); *B60J 3/0278* (2013.01)

(58) Field of Classification Search
CPC ............................ B60H 1/00871; B60J 3/0278
USPC ...................................... 296/97.1, 97.5, 1.07
See application file for complete search history.

(56) References Cited

U.S. PATENT DOCUMENTS

| | | | | |
|---|---|---|---|---|
| 5,296,678 A | * | 3/1994 | Schnorf | B60H 1/2225 165/42 |
| 6,592,447 B1 | * | 7/2003 | Yackman | B60H 1/248 454/162 |
| 7,032,949 B1 | * | 4/2006 | Wang | B60J 3/0239 296/97.5 |
| 8,215,696 B2 | * | 7/2012 | Akiya | B60J 3/0204 160/370.21 |
| 9,457,712 B2 | | 10/2016 | Salter et al. | |
| 9,821,637 B1 | * | 11/2017 | Robles | B60J 1/2091 |
| 2004/0084936 A1 | * | 5/2004 | Umebayashi | B60H 1/0055 296/208 |
| 2009/0072573 A1 | * | 3/2009 | Rawat | B60J 3/0208 296/97.1 |

FOREIGN PATENT DOCUMENTS

| | | |
|---|---|---|
| CN | 203283010 U | 11/2013 |
| DE | 202013000091 U1 | 3/2013 |
| EP | 2225117 B9 | 2/2012 |
| JP | 4621679 B2 | 1/2001 |
| JP | 2007216742 A | 8/2007 |
| KR | 20100112057 A | 10/2010 |

(Continued)

OTHER PUBLICATIONS

English Machine Translation of CN203283010U.

(Continued)

*Primary Examiner* — Jason S Morrow
*Assistant Examiner* — E Turner Hicks
(74) *Attorney, Agent, or Firm* — Vichit Chea; King & Schickli

(57) ABSTRACT

A sun visor for a vehicle includes a visor panel carrying at least one fan or blower adapted to provide an airflow that is directionally adjustable independently of an orientation of the visor panel.

17 Claims, 5 Drawing Sheets

(56) References Cited

FOREIGN PATENT DOCUMENTS

KR        20150005210 A        1/2015

OTHER PUBLICATIONS

English Machine Translation of DE202013000091U1.
English Machine Translation of EP2225117B9.
English Machine Translation of JP2007216742A.
English Machine Translation of JP4621679B2.
English Machine Translation of KR20100112057A.
English Machine Translation of KR20150005210A.

* cited by examiner

SUN VISOR WITH POSITIONAL COOLING/EXHAUSTING FAN

TECHNICAL FIELD

The present disclosure generally relates to sun visors for vehicles. More specifically, the present disclosure relates to a vehicle sun visor having an integrated positional cooling/exhaust fan.

BACKGROUND

Typically, all climate control functions for a vehicle passenger cabin are provided by the vehicle's heating, ventilation, and air-conditioning (HVAC) system, with conditioned air being delivered to the passenger cabin via ducting and registers routed through the vehicle instrument panel. The efficiency and register air output rate for conditioned air are highly impacted by the length/diameter of that ducting. In turn, the perceived efficiency of the climate control system is highly impacted by individual passenger preferences as well as the passenger's position in the vehicle relative to an air register. In conditions of extreme temperature, a passenger may be dissatisfied with the cooling/heating provided by the passenger cabin climate control system alone.

Further, typically vehicle climate control systems prioritize transfer of air into the passenger cabin. While measures are provided for exhausting air from the passenger cabin, the rate of air exhaustion may be insufficient to meet passenger desires in the event of elevated levels of environmental contaminants such as unpleasant odors, particulates such as cigarette smoke or pollen, volatile organic compound outgassing, etc. Air exhaustion may be significantly increased by the simple expedient of opening a vehicle window, but the uncontrolled increase in the rate of air entering the vehicle along with attendant noise and further particulate contamination from ambient air can further contribute to passenger dissatisfaction.

Accordingly, there is identified a need in the art for devices for supplementing traditional vehicle climate control systems. The devices should be economical, versatile, and efficient, and should integrate easily into existing vehicle components whereby the already limited packaging space available in the modern motor vehicle is not significantly impacted.

SUMMARY

In accordance with the purposes and benefits described herein, in one aspect of the present disclosure a sun visor is provided, comprising a visor panel including at least one fan or blower adapted to provide an airflow that is directionally adjustable independently of an orientation of the visor panel. In certain embodiments, the at least one fan or blower is carried in a gimballed frame carried by the visor panel. In certain other embodiments, the at least one fan or blower is carried by a hinged visor panel portion that is adapted for translation relative to a main visor panel portion. The at least one fan or blower may include at least one actuable light source.

In certain embodiments, the at least one fan or blower is further adapted for translation relative to the hinged visor panel portion. In one possible alternative embodiment the at least one fan or blower is carried in a gimballed frame carried by the hinged visor panel portion. In another possible alternative embodiment, the at least one fan or blower is carried by a track system disposed in the hinged visor panel portion.

In another aspect, a sun visor for a vehicle is provided comprising a main visor panel including at least one fan or blower that is carried by a hinged visor panel portion adapted for translation relative to the main visor panel. The at least one fan or blower may be adapted for translation relative to the hinged visor panel portion.

In embodiments, the sun visor further comprises a track adapted for a lateral translation of the at least one fan or blower within the hinged visor panel portion. The track may include a transversely oriented electrical contact assembly adapted to supply an electrical charge to the at least one fan or blower.

In yet another aspect of the disclosure, a sun visor for a vehicle is provided comprising at least one interior fan or blower in fluid communication with at least one adjustable vent adapted to provide a directionally adjustable airflow independently of an orientation of the sun visor. At least one slidable cover may be provided, adapted for covering or uncovering the at least one fan or blower. The sun visor may be defined by a pair of hingedly attached visor panels. The at least one fan or blower is held between the pair of hingedly attached visor panels.

In embodiments, the at least one adjustable vent comprises at least one rotatably adjustable vent in fluid communication with the at least one fan or blower. The at least one rotatably adjustable vent may include a plurality of rotatably adjustable vents provided as a rotatable barrel vent member. In other embodiments, the at least one adjustable vent may comprise a plurality of adjustable vanes.

In the following description, there are shown and described embodiments of the disclosed sun visor for a vehicle. As it should be realized, the described device is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed sun visor for a vehicle, and together with the description serve to explain certain principles thereof. In the drawings.

Reference will now be made in detail to embodiments of the disclosed sun visor for a vehicle, examples of which are illustrated in the accompanying drawing figures.

DETAILED DESCRIPTION

At a high level, the present disclosure is directed to a sun visor for a vehicle that includes at least one fan or blower. By various mechanisms for providing various degrees and directions of positional adjustment for the at least one fan or blower, the described sun visor comprising one or more fans or blowers is adapted to supplement the vehicle climate control system's function of providing cooling airflow to a vehicle occupant. In turn, in other orientations the described sun visor comprising one or more fans or blowers is adapted to exhaust air from an interior of the vehicle passenger cabin, thus allowing enhanced removal of odors, particulates and other environmental contaminants, etc.

Figure 1A:
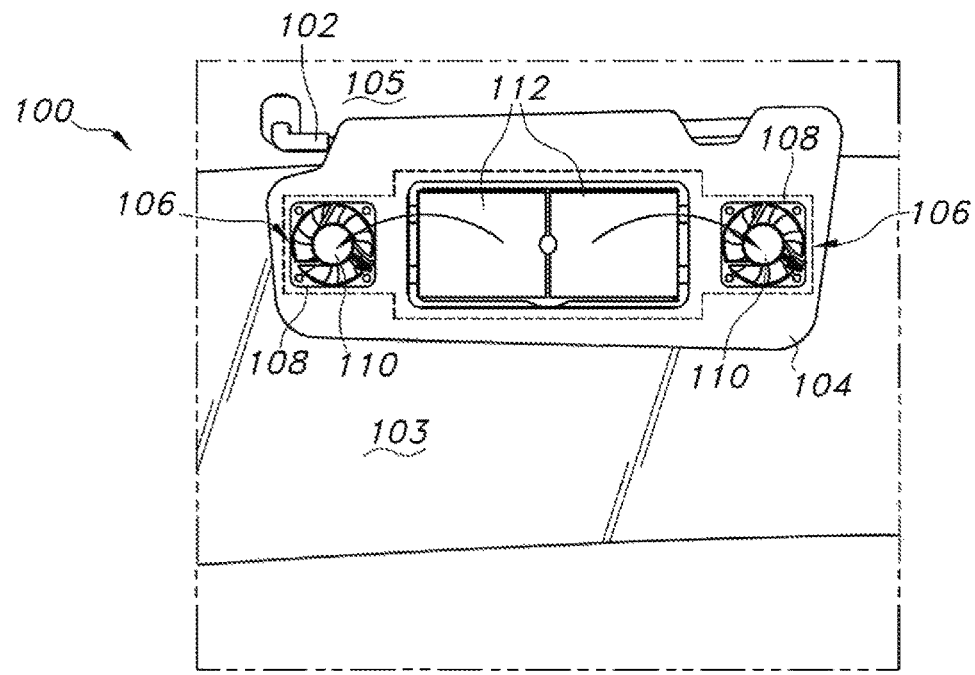
FIG. 1A shows a sun visor including a fan or blower according to the present disclosure.

FIG. 1A illustrates an embodiment of a sun visor assembly 100 according to the present disclosure. The sun visor assembly 100 includes a pivoting support arm 102 and a visor panel 104. As is known, the visor panel 104 is carried by the support arm 102 for arcuate pivoting in a vehicle (not shown in this view) fore-aft direction whereby the visor panel may be placed substantially flush against, respectively, the vehicle windshield 103 or side window (not shown) or the vehicle headliner 105.

The visor panel 104 as depicted further includes a pair of fans or blowers 106, each including a frame 108 and one or more rotating blades 110 for moving air. As will be appreciated, the number of fans or blowers 106 may be fewer or more than those shown in FIG. 1A, in accordance with an amount of air moving capacity possible with the fan or blower(s) 106, a size of the visor panel 104, a weight tolerance of the sun visor assembly 100, and other manufacturing considerations. It will further be appreciated that the selection of use of a fan or a blower may depend on particular situations, since typically a blower is capable of an increased airflow compared to a fan. A supply of electrical power may be provided to the fan(s) or blower(s) 106 by any suitable means, including without intending any limitation one or more batteries (not shown), or by wired means (not shown) routed through an interior of the visor panel 104 and/or the support arm 102 and connecting to a wiring harness (not shown) that is directly or indirectly connected to a vehicle power source such as an onboard battery (not shown).

Figure 1B:
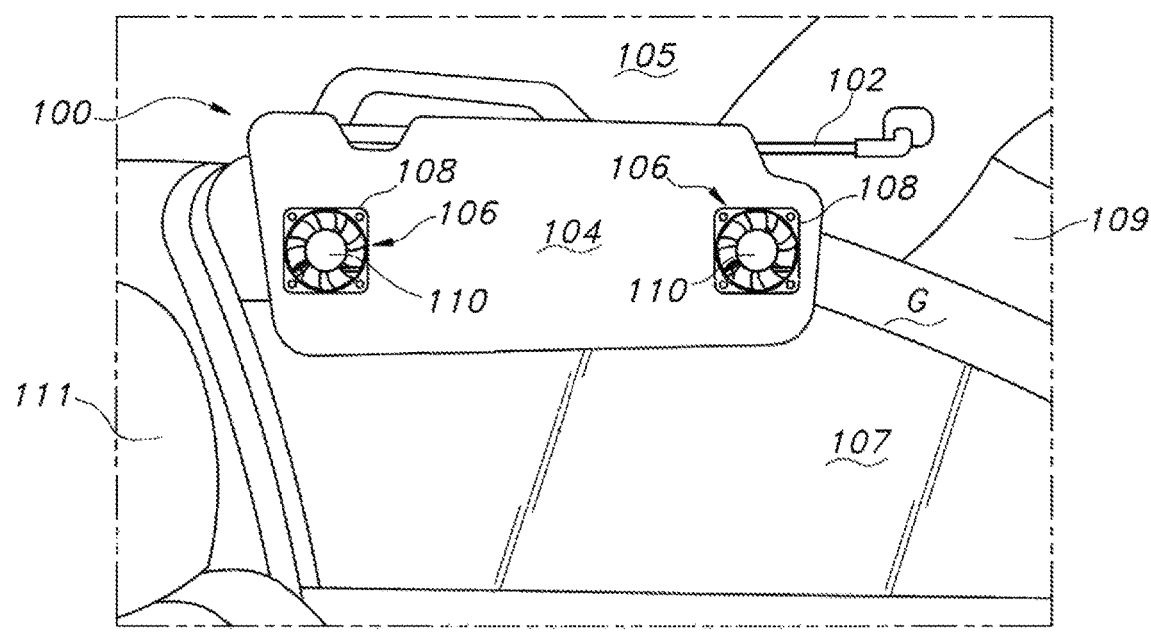
FIG. 1B shows the sun visor of FIG. 1A, positioned to exhaust air from a vehicle passenger cabin.

In turn, the support arm 102 is connected to the vehicle headliner 105 or roof panel (not shown) whereby the support arm and attached visor panel 104 may be pivoted in an arc between the vehicle windshield 103 (not shown in this view) and the vehicle side window 107 whereby the visor panel 104 is held substantially coplanar to the vehicle side window (see FIG. 1B). As will be appreciated and as shown in the drawing figure, by the simple expedient of lowering the vehicle side window 107 whereby the fans or blower(s) 106 are disposed before a gap G between a top of the side window 107 and the headliner 105 and/or a pillar 109, actuation causes the fan(s) or blower(s) to function as exhaust fans, assisting in removing odors, particulate contaminants, and other environmental contaminants from an interior of the vehicle passenger cabin 111.

As will be appreciated, at least a portion of the fan(s) or blower(s) 106 must be made sufficiently open to allow movement of air therethrough. Unfortunately, this also allows sunlight and glare to pass through the fan(s) or blower(s) 106. Optionally, the visor panel may further include one or more glare blocking panels 112 adapted to pivot to selectively cover/uncover the fan(s) or blower(s) 106. When the fan(s) or blower(s) 106 are not in use, the one or more sun blocking panels 112 may be pivoted to substantially cover any open space associated with the fan(s) or blower(s) 106.

Figure 2A:
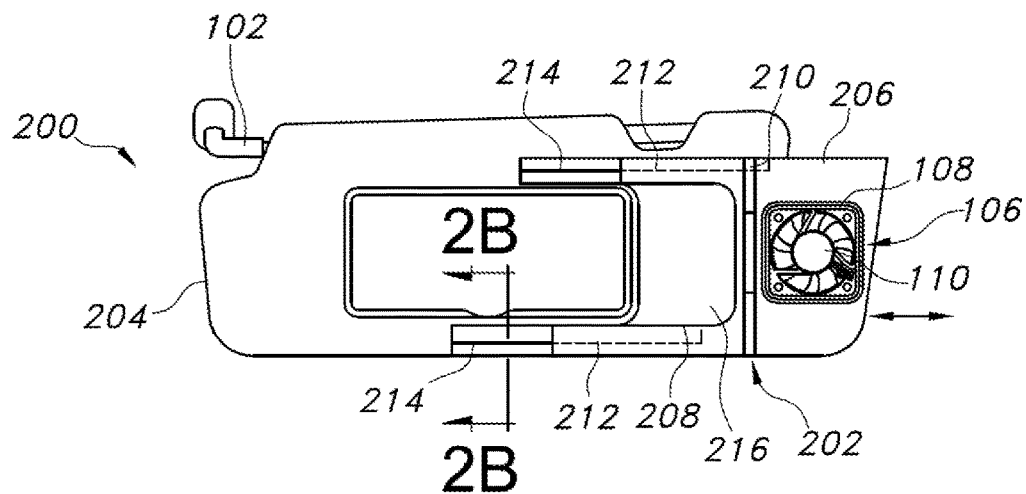
FIG. 2A shows an alternative embodiment of a sun visor including fans or blowers according to the present disclosure.
Figure 2B:
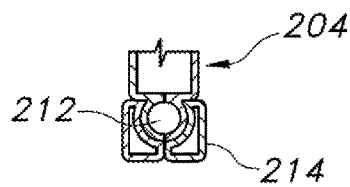
FIG. 2B shows a cross-sectional view of a track system for use in the sun visor of FIG. 2A.
Figure 2C:
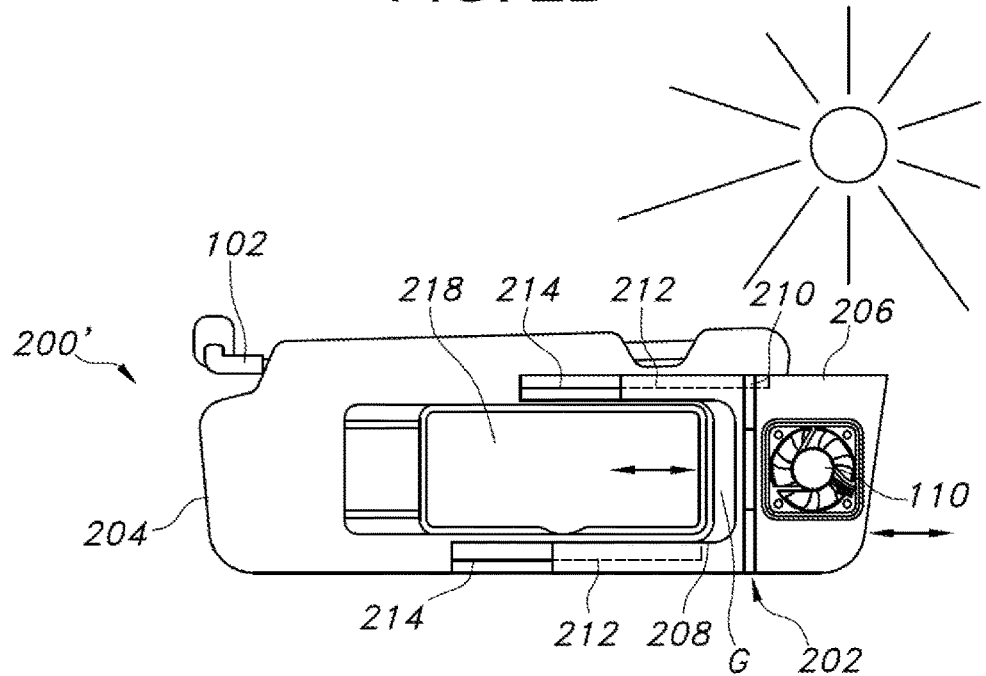
FIG. 2C shows an alternative embodiment of the sun visor of FIG. 2A.

As noted above, the described visor panel 104 comprises one or more fans or blowers 106 that are adapted for positional adjustment in a number of directions. In one embodiment, a function of adjustability may be provided by a visor panel including a sliding portion. With reference to FIGS. 2A-2C, a sun visor assembly 200 is shown including a sliding visor panel portion 202 and a main visor panel portion 204. The sliding visor panel portion 202 carries a fan or blower 106 substantially as described above.

As shown, the sliding visor panel portion 202 includes a pivoting segment 206 connected to a sliding segment 208 by one or more hinges 210. In embodiments, the one or more hinges 210 may be friction hinges of a known design. The sliding segment 208 is defined in the depicted embodiment by a pair of slide arms 212 adapted for lateral translation within cooperating tracks 214 (see FIG. 2B) defined within the main visor panel portion 204.

Optionally, a glare blocking panel 216 may be provided bridging the pair of slide arms 212 whereby glare is blocked when the sliding visor panel portion 202 is extended as shown in the drawing. In an alternative embodiment (see FIG. 2B), a sliding mirror cover 218 may be provided to block glare. The sliding mirror cover 218 may be adapted and dimensioned to selectively slide laterally (see arrow) to cover one or both of a gap G between the pair of slide arms 212 and any open space associated with the fan(s) or blower(s) 106.

Figure 3A:
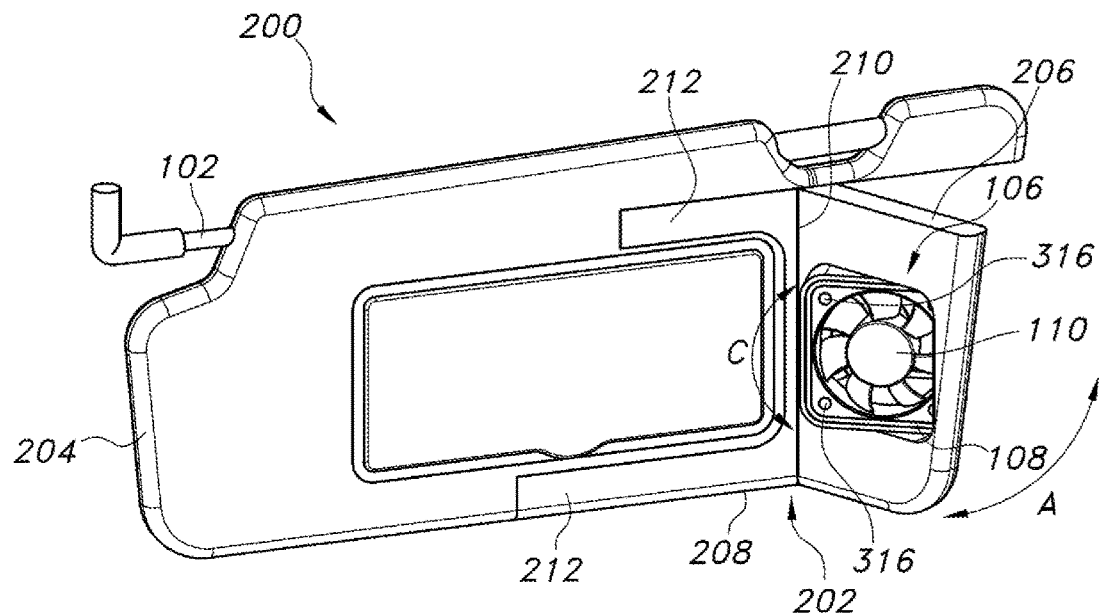
FIG. 3A is a rear view illustrating operation of the sun visor of FIG. 2A, including operation of a hinged visor portion and of a fan or blower.
Figure 3B:
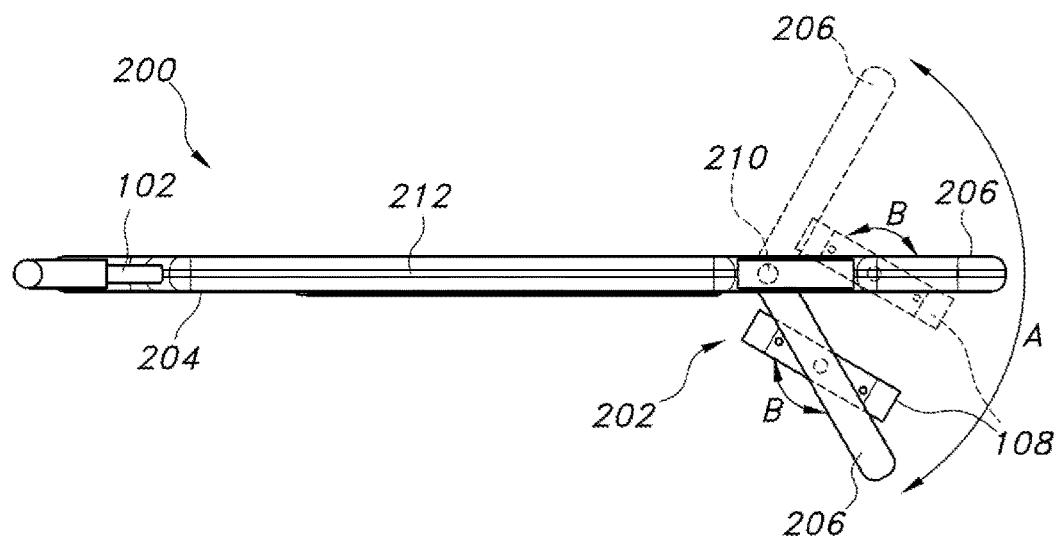
FIG. 3B is a top plan view illustrating operation of the sun visor of FIG. 2A.

FIGS. 3A-3B illustrates additional positional adjustments of the fan(s) or blower(s) 106 that are made possible by the described mechanisms. As shown, by way of frictional hinge(s) 210 the visor pivoting segment 206 may be pivoted about an axis defined by the hinge(s) (arrow A).

In turn, in embodiments the fan(s) or blower(s) 106 are gimballed to provide further flexibility in positional adjustment of the fan members and an airflow direction provided thereby. In the depicted embodiment, this is provided by a frame 108 comprising a two-axis gimbal of known design. As shown, this allows the one or more fans or blowers 106 to be pivoted in a vehicle y-axis (arrows B; see FIG. 3B) and a vehicle z-axis (arrow C; see FIG. 3A) direction within the sliding visor panel portion 202, thus further increasing adjustability of the direction of airflow provided by the one or more fans or blowers 106.

It is contemplated to provide lighting systems for the fan(s) or blower(s) 106. These may be as simple as one or more actuable light sources 316 disposed on the frames 108 (see FIG. 3A). The actuable light sources 316 may be placed centrally in the frame 108, at one or more corners as shown in FIG. 3A, or both, to serve as a directional light source for passenger convenience in low light conditions. Alternatively, it is contemplated to provide a more sophisticated lighting system, for example one or more colored actuable light sources 316 to provide a visual alert to a user that the fan blade 110 has been actuated. This may be useful to a passenger, given the quiet nature of modern fans or blowers 106 and the degree of external noise typically encountered during operation of a motor vehicle.

Figure 4A:
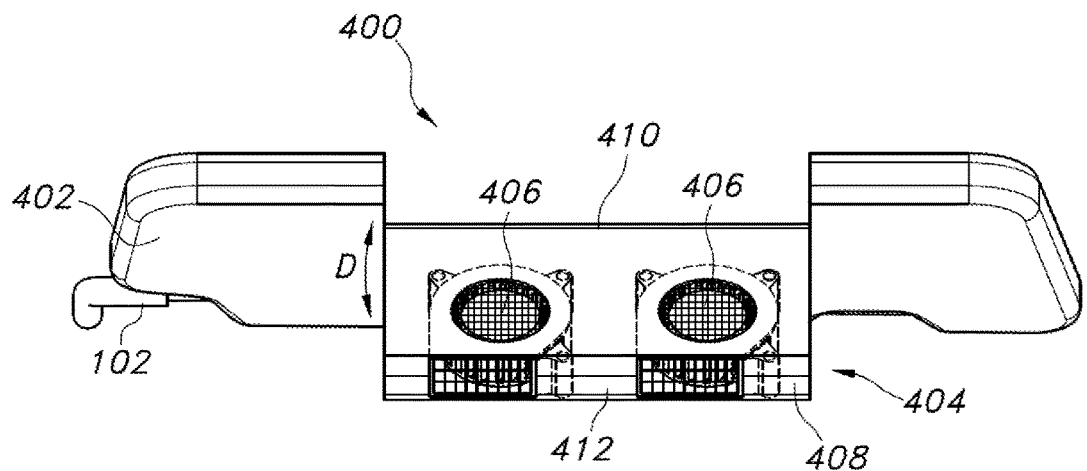
FIG. 4A shows another alternative embodiment of a sun visor including fans or blowers according to the present disclosure.
Figure 4B:
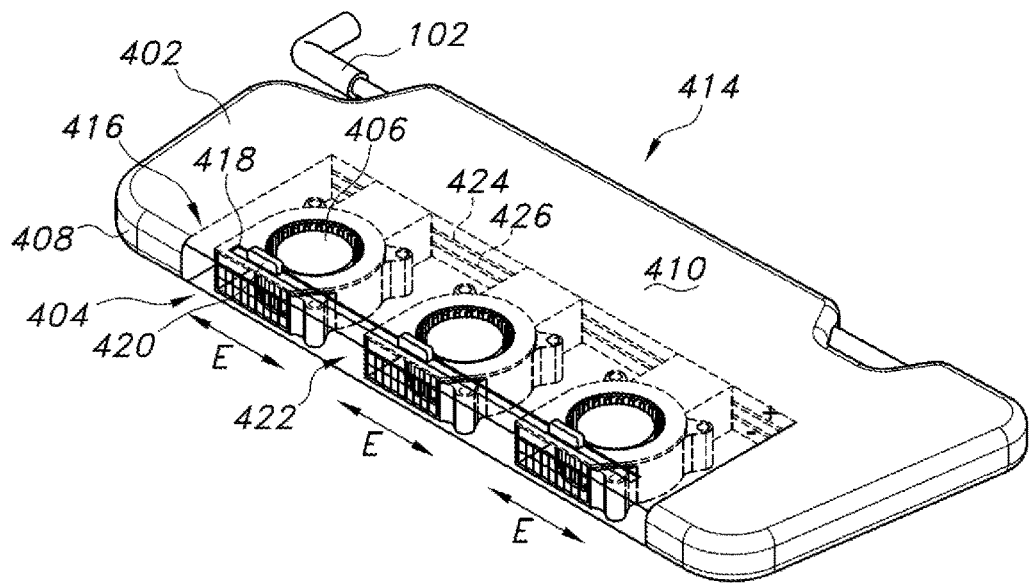
FIG. 4B shows an alternative embodiment of the sun visor of FIG. 4A.
Figure 4C:
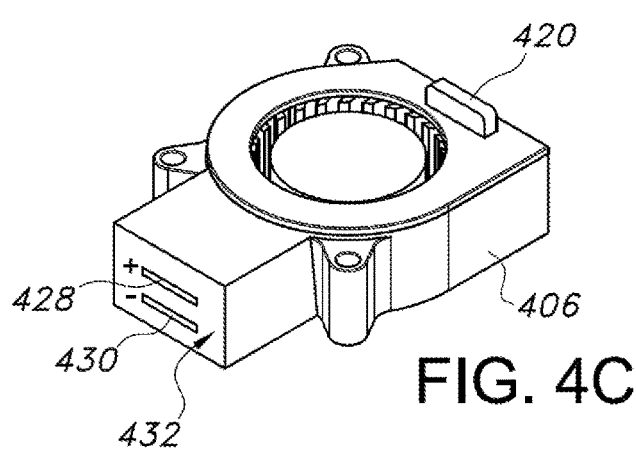
FIG. 4C shows a rear view of a fan or blower configured for use in the sun visor of FIG. 4B.

In yet another embodiment, with reference to FIGS. 4A-4C, it is contemplated to provide a visor panel 400 including a main visor portion 402 and a pivoting visor portion 404 or "flipper panel." The pivoting visor portion 404 may be hingedly attached to the main visor portion 402 by a suitable hinge arrangement (not visible in this view) such as one or more friction hinges. The pivoting visor portion 404 includes one or more fans or blowers 406 disposed whereby air outflow is effected through an edge 408 of the pivoting visor portion. Air intake may be via one or both of a top surface 410 and a bottom surface 412 (not visible in this view) of the pivoting visor portion 404. The top and/or bottom surfaces 410, 412 may comprise or be covered by a suitably air-permeable but particulate-resistant panel such as a plastic or metal grate, a mesh fabric, or combinations. While the depicted embodiment shows two fan members 406, it will be appreciated that fewer or more fans or blowers 406 may be provided in accordance with an amount of air moving capacity possible with the fans or blowers, a size of the visor panel 400, a weight tolerance of a sun visor assembly including the visor panel, and other manufacturing considerations.

As will be appreciated, the pivoting visor portion 404 may be arcuately translated along a vehicle z-axis (arrow D) whereby an airflow direction of air exiting the fan member(s) 406 is similarly altered. As will also be appreciated, by way of support arm 102 (not shown in this view), as described above in the discussion of FIGS. 1A-1B the support arm and attached visor panel 400 may be pivoted in an arc between the vehicle windshield 103 (not shown in this view) and the vehicle side window 107 (not shown in this view) whereby the visor panel 400 is held substantially coplanar to the vehicle side window. As will be appreciated and as shown in the drawing figure, by the simple expedient of lowering the vehicle side window 107 and pivoting the pivoting visor portion 404 whereby the fan(s) or blower(s) 406 are oriented to direct airflow through a gap G (not shown in this view) between a top of the side window 107 and the headliner 105 and/or a pillar 109 (not shown in this view), actuation causes the fan(s) or blower(s) to function as exhaust fans, assisting in removing odors, particulate contaminants, and other environmental contaminants from an interior of the vehicle passenger cabin 111 (not shown in this view).

The fan(s) or blower(s) 406 could be fixed in place within the pivoting visor portion 404. In an alternative embodiment, the fan(s) or blower(s) 406 may be fans or blowers adapted for lateral translation within the pivoting visor portion 404. With reference to FIG. 4B, a sun visor assembly 414 is shown, including a visor panel 400 substantially as shown in FIG. 4A carried by a support arm 102 as described above. In the depicted embodiment, the pivoting visor portion 404 includes a receiver 416 configured and dimensioned to receive one or more fans or blowers 406 therein. The pivoting visor portion 404 further includes a guide track 418 defined therein, adapted for receiving a cooperating tab 420. The pivoting visor portion may further define an air exhaust 422 in edge 408, which may optionally be covered by a suitably air-permeable but particulate-resistant panel (not shown for convenience) such as a plastic or metal grate, a mesh fabric, or combinations as described above. As will be appreciated, by the cooperative interaction of the guide track 418 and cooperating tab 420, the one or more fans or blowers 406 may be laterally translated along at least a partial length dimension of the pivoting visor portion edge 408, further increasing the degree and range of positional adjustment possible for the fan member(s).

In an embodiment, an electrical current to power the one or more fans or blowers 406 is provided by disposing suitable visor panel electrical contacts 424, 426 in an interior of the pivoting visor portion 404. In turn, cooperating fan or blower electrical contacts 428, 430 may be disposed on a rear edge 432 of each fan or blower 406 (see FIG. 4C). As will be appreciated, the receiver 416 and fan or blower 406 will be cooperatively configured and dimensioned whereby, when the fans or blowers are disposed within the receiver as shown in FIG. 4B, contact between the visor panel electrical contacts 424, 426 and the cooperating fan or blower electrical contacts electrical contacts 428, 430 (see FIG. 4C) will be maintained as the fans or blowers are translated laterally (arrows D) within the pivoting visor portion 404. Thus, an uninterrupted power supply to the fans or blowers 406 is assured.

Figure 5A:
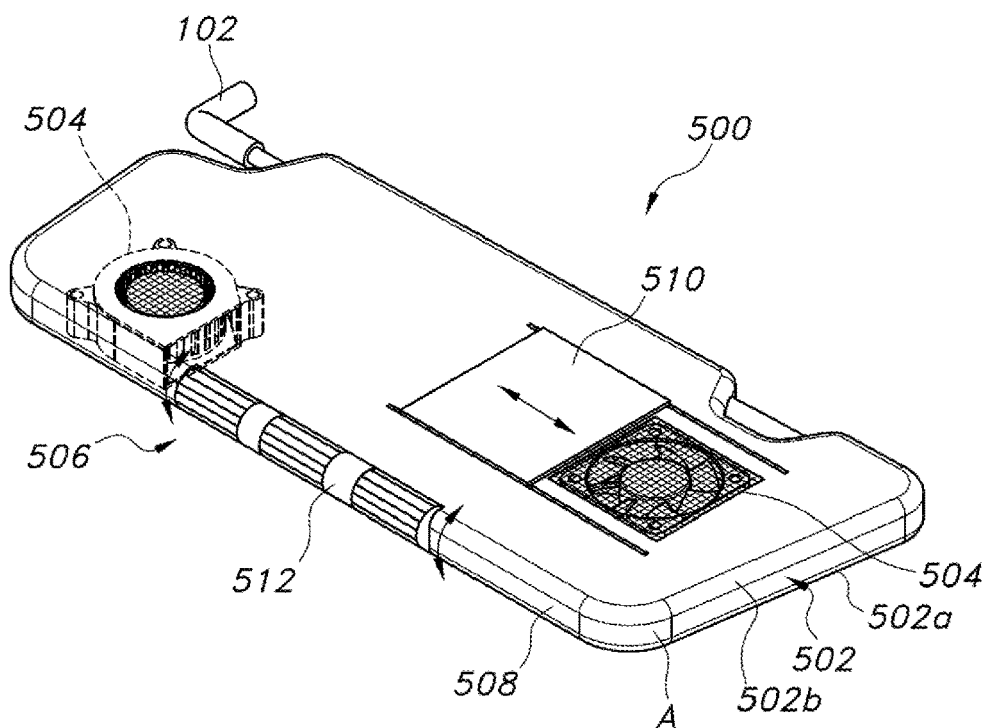
FIG. 5A shows yet another alternative embodiment of a sun visor including fans or blowers and an adjustable vent structure adapted to provide a directionally adjustable airflow.
Figure 5B:
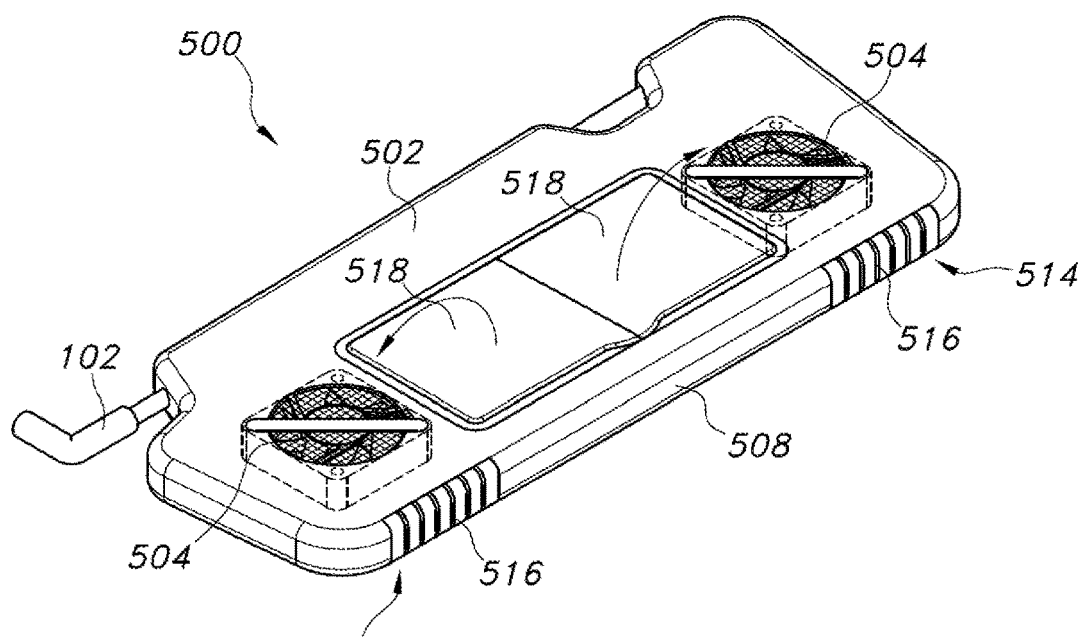
FIG. 5B shows an alternative embodiment for an adjustable vent structure for the sun visor of FIG. 5A.

In still yet another embodiment, with reference to FIGS. 5A and 5B, it is contemplated to provide a sun visor 500 including a visor panel 502 having one or more fans or blowers 504 in fluid communication with one or more adjustable vents 506. The one or more adjustable vents 506 are adapted to provide an airflow that is directionally adjustable with respect to and independently of an orientation of the visor panel 500. The airflow is effected by positioning the one or more adjustable vents 506 on an edge 508 of the visor panel 500.

The visor panel may be configured as a clamshell design, including two coplanar panels 502a, 502b hingedly connected at an edge, with the one or more fans or blowers 504 captured therebetween. In one possible embodiment (see FIG. 5A), the one or more fans or blowers 504 may be carried in an aperture defined in each of the coplanar panels 502a, 502b, with a slidable panel 510 provided to cover or uncover each open side of the one or more fans or blowers 504. As will be appreciated, this provides a mechanism for increasing or decreasing air intake by the one or more fans or blowers 504. In another possible embodiment, also shown for convenience in FIG. 5A, a blower 504 may be disposed between the coplanar panels 502a, 502b.

In one embodiment (see FIG. 5A), the one or more adjustable vents 506 are provided as a rotatable barrel vent 512 which is adapted to directionally adjust a direction of airflow provided by the one or more fans or blowers 504 by rotating about a longitudinal axis A of the visor panel 500 (see arrows). In another possible embodiment (see FIG. 5B), the one or more adjustable vents 506 are provided as edge 508-mounted registers 514 including one or more adjustable vanes 516 adapted to alter a direction of airflow exiting the visor panel 502. The visor panel 502 may further include one or more displaceable panels 518 adapted to pivot or slide to selectively cover/uncover the one or more fans or blowers 504. This is substantially as discussed above for the glare blocking panels 112 of FIG. 1A. When not in use to cover the one or more fans or blowers 504, the displaceable panels 518 may serve to cover a mirror (not visible in this view) carried by the visor panel 502.

As will be appreciated, by the above-described mechanisms an effective, simple, and robust air moving system is provided which may supplement the cooling function of a vehicle's climate control system by more accurately directing airflow to, e.g., a vehicle occupant's head and neck area by way of the fans or blowers 106, 406 described above. In turn, as discussed the above-described visor panels including fans or blowers likewise provide a simple and effective supplemental exhausting or venting mechanism for exhausting environmental contaminants such as odors, particulates, pollution, etc. from the vehicle passenger cabin interior.

Obvious modifications and variations are possible in light of the above teachings. For example, the fans or blowers 106 may be configured to actuate on operating a vehicle carrying them, such as by starting the engine or otherwise enabling the vehicle electrical accessories. Alternatively, a dedicated actuator may be provided for the fans or blowers 106, disposed on one or more of the visor panel 104/204, on a vehicle dash panel, on a vehicle door panel or door trim panel, on a vehicle center console, or elsewhere. The actuator may be a simple mechanical or capacitive on/off switch, or may be a more sophisticated device such as a capacitive switch, slide bar, or "dimmer" switch adapted to adjust one or more of a fan 110 speed of rotation, an intensity of actuable light sources 216, etc. All such modifications and variations are within the scope of the appended claims when interpreted in accordance with the breadth to which they are fairly, legally and equitably entitled.

What is claimed:

1. A sun visor comprising a visor panel including at least one fan or blower adapted to provide an airflow that is directionally adjustable independently of an orientation of the visor panel;
wherein the visor panel comprises:
a main visor panel portion; and
a sliding visor panel portion defined by a sliding panel segment hingedly attached to a hinged panel segment.

2. The sun visor of claim 1, wherein the at least one fan or blower is carried by the hinged panel segment.

3. The sun visor of claim 2, wherein the hinged panel segment is adapted for translation relative to the main visor panel portion whereby the at least one fan or blower may be translated between a first orientation directing the airflow towards an interior of a vehicle carrying the sun visor and a second orientation directing the airflow to an exterior of the vehicle carrying the sun visor.

4. The sun visor of claim 2, wherein the at least one fan or blower is adapted for translation relative to the hinged panel segment.

5. The sun visor of claim 1, wherein the at least one fan or blower includes at least one actuable light source.

6. A sun visor for a vehicle, comprising:
a main visor panel;
a pivoting visor panel portion carried by the main visor panel; and
at least one fan or blower that is carried by and adapted for lateral translation within an interior of the pivoting visor panel portion.

7. The sun visor of claim 6, further comprising a track adapted for the lateral translation of the at least one fan or blower.

8. The sun visor of claim 7, wherein the hinged visor panel portion is adapted for translation relative to the main visor panel whereby the at least one fan or blower may be translated between a first orientation directing an airflow towards an interior of a vehicle carrying the sun visor and a second orientation directing the airflow to an exterior of the vehicle carrying the sun visor.

9. The sun visor of claim 8, wherein the track comprises a transversely oriented electrical contact assembly adapted to supply an electrical charge to the at least one fan or blower.

10. A sun visor for a vehicle, comprising:
a visor defined by a pair of hingedly attached visor panels; and
at least one interior fan or blower held between the pair of hingedly attached visor panels and in fluid communication with at least one adjustable vent adapted to provide a directionally adjustable airflow independently of an orientation of the visor.

11. The sun visor of claim 10, including at least one rotatably adjustable vent.

12. The sun visor of claim 10, including a plurality of rotatably adjustable vents provided as a rotatable barrel vent member.

13. The sun visor of claim 10, including the at least one adjustable vent comprising a plurality of adjustable vanes.

14. The sun visor of claim 10, including at least one slidable cover adapted for covering or uncovering the at least one fan or blower.

15. The sun visor of claim 6, wherein the hinged visor panel portion is adapted for translation relative to the main visor panel whereby the at least one fan or blower may be translated between a first orientation directing an airflow towards an interior of a vehicle carrying the sun visor and a second orientation directing the airflow to an exterior of the vehicle carrying the sun visor.

16. The sun visor of claim 15, wherein the at least one fan or blower is carried by a gimballed frame carried by the hinged visor panel portion.

17. The sun visor of claim 4, wherein the at least one fan or blower is carried in a gimballed frame disposed in the hinged panel segment.

* * * * *